(12) United States Patent
Adelman et al.

(10) Patent No.: US 8,434,298 B2
(45) Date of Patent: May 7, 2013

(54) METHOD FOR INJECTING AMMONIA INTO AN EXHAUST GAS STREAM

(75) Inventors: Brad J. Adelman, Chicago, IL (US); Vadim Strots, Forest Park, IL (US); Shyam Santhanam, Aurora, IL (US); Edward M. Derybowski, Hanover Park, IL (US); Michael J. Miller, Mt. Prospect, IL (US)

(73) Assignee: International Engine Intellectual Property Company, LLC, Lisle, IL (US)

( * ) Notice: Subject to any disclaimer, the term of this patent is extended or adjusted under 35 U.S.C. 154(b) by 228 days.

(21) Appl. No.: 12/828,546

(22) Filed: Jul. 1, 2010

(65) Prior Publication Data

US 2012/0000183 A1 Jan. 5, 2012

(51) Int. Cl.
  *G06G 7/70* (2006.01)
  *F01N 3/00* (2006.01)
(52) U.S. Cl.
  USPC .............. 60/286; 60/295; 60/297; 701/114; 701/115
(58) Field of Classification Search .......... 60/286, 60/297, 295; 701/114, 115
  See application file for complete search history.

(56) References Cited

U.S. PATENT DOCUMENTS

| 6,427,439 | B1 * | 8/2002 | Xu et al. ................ 60/286 |
| 6,823,663 | B2 * | 11/2004 | Hammerle et al. ........ 60/286 |
| 6,983,591 | B2 * | 1/2006 | Kondo et al. ........... 60/295 |
| 7,497,076 | B2 * | 3/2009 | Funk et al. ............. 60/286 |
| 7,788,910 | B2 * | 9/2010 | McCabe et al. .......... 60/295 |
| 2004/0098973 | A1 | 5/2004 | Tennison et al. |
| 2006/0000202 | A1 * | 1/2006 | Ripper et al. .......... 60/286 |
| 2008/0098726 | A1 | 5/2008 | Donaldson et al. |
| 2009/0272099 | A1 | 11/2009 | Garmella et al. |
| 2010/0083641 | A1 | 4/2010 | Makartchouk et al. |
| 2010/0132338 | A1 | 6/2010 | Schmale |
| 2011/0023462 | A1 * | 2/2011 | Kurtz et al. ............ 60/286 |

OTHER PUBLICATIONS

Written Opinion of the International Searching Authority, Nov. 25, 2011, 8 Pages.

* cited by examiner

*Primary Examiner* — Thomas Denion
*Assistant Examiner* — Anthony Ayala Delgado
(74) *Attorney, Agent, or Firm* — Mark C. Bach; Jeffrey P. Calfa

(57) ABSTRACT

A method (10) for injecting ammonia ($NH_3$) into exhaust gas upstream of a catalyst of an aftertreatment system includes the steps of determining whether a regeneration event is imminent (14) on the basis of predetermined parameters, and determining whether dosing parameters are met (22). The method (10) further includes the steps of calculating an amount of $NH_3$ to fill the catalyst (18) and adjusting a quantity of $NH_3$ dosed (22) before the regeneration event occurs.

10 Claims, 1 Drawing Sheet

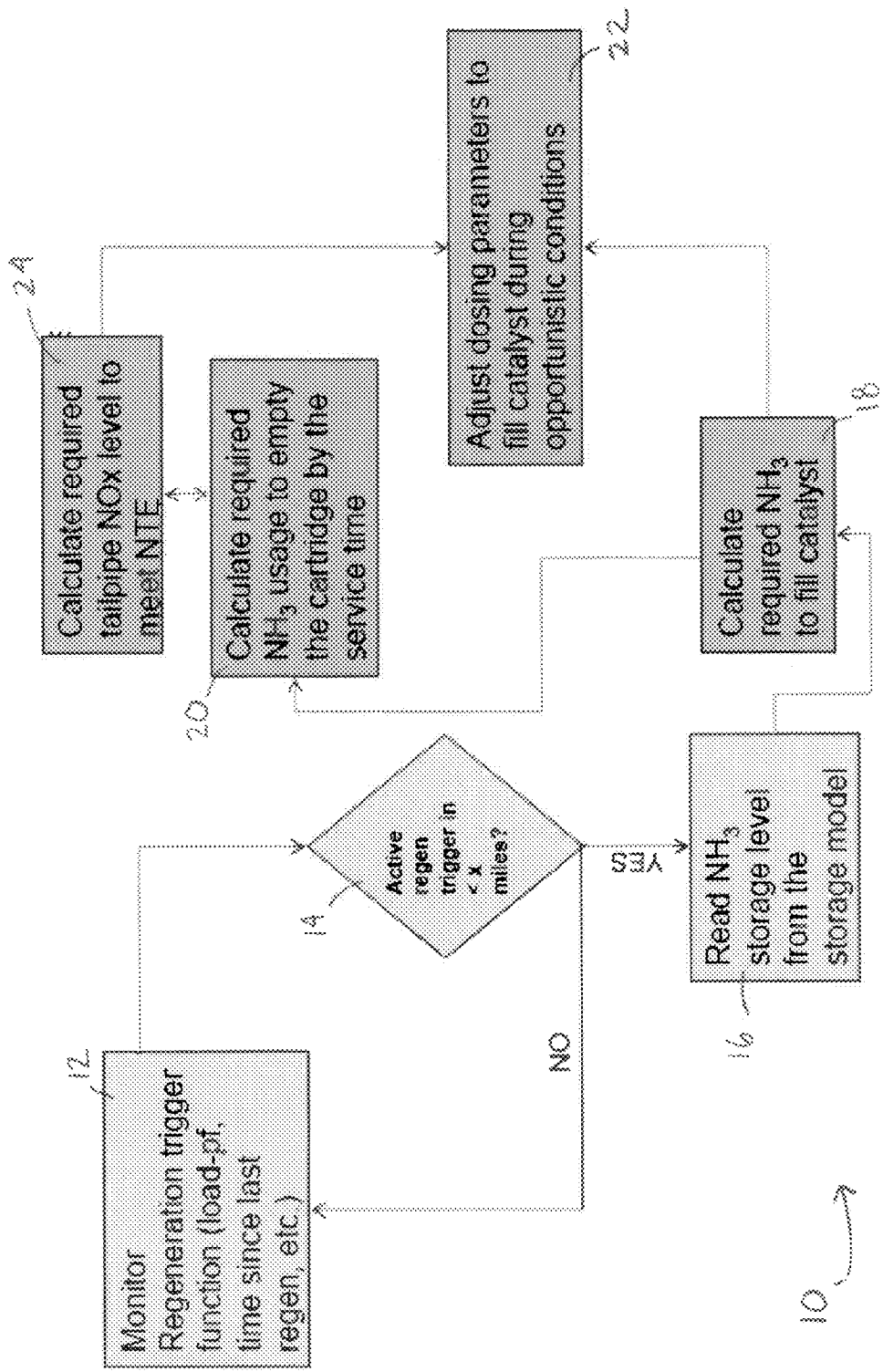

METHOD FOR INJECTING AMMONIA INTO AN EXHAUST GAS STREAM

BACKGROUND

Embodiments described herein relate to a method for injecting an emission liquid reductant into a gas stream, and more particularly, to a method for injecting ammonia into an exhaust gas stream of a diesel engine.

Diesel engine combustion results in the formation of nitrogen oxides, ($NO_x$), in the exhaust gas. Aftertreatment systems, typically selective catalytic reduction systems (SCR systems) are used to reduce oxides of Nitrogen ($NO_x$) emitted from engines. Nitrogen oxides can be reduced by ammonia ($NH_3$), yielding $N_2$, $H_2O$ and $CO_2$. In the aftertreatment process, NOx reacts with the ammonia, which is injected into the exhaust gas stream upstream of an SCR Catalyst.

The aftertreatment process controls the ammonia injecting rate. An insufficient injection may result in low NOx conversions, and an injection rate that is too high may result in release of ammonia to the atmosphere, known as ammonia slip. The ammonia slip increases at higher $NH_3$/NOx ratios. The ammonia injection depends on the injection characteristics and the energy of the exhaust gas. If the ammonia is improperly dosed with respect to the amount, the timing, the temperature, the space velocity, the current storage level and the NOx mass flow, ammonia slippage may result.

When the diesel particulate filter (DPF) of the aftertreatment system is in an active regeneration mode, the exhaust temperature and flow rate increase with respect to base operation. In this situation, an increased amount of ammonia is dosed, which depletes the ammonia stored on the DPF.

Further, for an aftertreatment system that uses solid ammonia, the quantity of ammonia stored on the vehicle should be sufficient to last the service life of the vehicle, while at the same time the quantity of ammonia should be nearly depleted at the end of the service life of the vehicle. Thus, the injection of ammonia should be sufficient to reduce the NOx, and should also correspond to the storage capabilities of the SCR system.

SUMMARY

A method for injecting ammonia ($NH_3$) into exhaust gas upstream of a catalyst of an aftertreatment system includes the steps of determining whether a regeneration event is imminent on the basis of predetermined parameters, and determining whether dosing parameters are met. The method further includes the steps of calculating an amount of $NH_3$ to fill the catalyst, and adjusting a quantity of $NH_3$ dosed before the regeneration event occurs.

Another method for injecting ammonia ($NH_3$) into exhaust gas upstream of a catalyst of an aftertreatment system includes the steps of determining whether a regeneration event will occur in less than a predetermined distance to be driven, and determining whether the exhaust gas temperature is below a predetermined temperature. An amount of $NH_3$ to fill the catalyst to a selected storage level is calculated. The method further includes adjusting the quantity of $NH_3$ dosed before the regeneration event occurs under the condition that both the regeneration event will occur in less than the predetermined distance and the exhaust gas temperature is below the predetermined temperature.

In another method for injecting ammonia ($NH_3$) into exhaust gas upstream of a catalyst of an aftertreatment system, the method includes determining whether a regeneration event will occur in less than about 20-miles to be driven and determining whether the exhaust gas temperature is below about 250-degrees C. The actual storage level of $NH_3$ of the catalyst is read, and the amount of $NH_3$ to fill the catalyst to a selected storage level is calculated. The method further includes the steps of increasing the quantity of $NH_3$ dosed before the regeneration event occurs when both the regeneration event will occur in less than about 20-miles to be driven and the exhaust gas temperature is below about 250-degrees C., and subsequently decreasing the quantity of $NH_3$ dosed when the exhaust gas temperature exceeds about 250-degrees C.

BRIEF DESCRIPTION OF THE DRAWINGS

FIG. 1 is a flow diagram showing the method of injecting ammonia into an exhaust gas stream.

DETAILED DESCRIPTION

Referring to FIG. 1, an injection method for injecting ammonia into an exhaust gas stream of a diesel engine is indicated generally at 10. Although the following description will be directed to a method for injecting ammonia in a vehicle aftertreatment system, the system and method of FIG. 1 can be used with any diesel engine that emits NOx.

When the diesel engine combusts diesel, nitrogen oxides form and are released with the exhaust gas (EG). Nitrogen oxides, NOx, are a pollutant that are reduced in the aftertreatment system by ammonia ($NH_3$) resulting in the emission of less harmful nitrogen, $N_2$, water, $H_2O$, and carbon dioxide, $CO_2$.

In the injection method 10, the rate of $NH_3$ injection is based on a soot loading at a diesel particulate filter (DPF). Particulate matter or "soot" from the exhaust gas accumulates on the DPF, and if left unchecked, can create a back pressure in the aftertreatment system. A regeneration event, also referred to as "regeneration", is the periodic oxidation of the collected particulate matter in the aftertreatment system during routine diesel engine operation. When the diesel particulate filter of the exhaust system experiences a build-up of soot, the soot is oxidized to "regenerate" the filter. An active regeneration is initiated periodically depending on the soot loading, the distance driven since the last regeneration, or the amount of time since the last regeneration, among other factors.

The injection method 10 may be implemented by software on the vehicle, such as at an engine control unit (ECU), however other controllers are possible. At monitoring step 12 and determination step 14, the ECU monitors and determines whether active regeneration of the DPF is going to occur in less than a predetermined parameter, for example a distance remaining/distance to be driven X. The distance remaining X is an easily measured parameter that relates to the soot loading on the DPF when active regeneration is impending. An exemplary distance remaining X is about 20-miles, however other distances are possible.

Alternatively, the determination of whether regeneration is imminent may be made by reading a soot level loading at the DPF (load-pf), an amount of time since the last regeneration of the DPF (time-pf), a system back pressure (bp), among other parameters. It is possible that these parameters can be read by sensors, can be estimated values, or can be calculated values that are compared with pre-programmed values.

At determination step 14, if active regeneration is not going to occur in less than the predetermined parameter, for example distance remaining X, then the method loops to monitoring step 12. If active regeneration is going to occur in less than the predetermined parameter, for example distance remaining X, then the storage level of $NH_3$ at the catalyst is read.

The $NH_3$ dosing method 10 is configured to maintain NOx conversion efficiency during all operating conditions. An NOx reduction catalyst is located downstream of the location of $NH_3$ injection, and the catalyst stores $NH_3$ on the catalyst surface. At a low temperature, for example about less than 250° C., the $NH_3$ is stored on the catalyst. As the temperature increases, the storage capability of the catalyst diminishes and the $NH_3$ on the surface is released to either react with the incoming exhaust gas stream or escapes through to the tailpipe.

At catalyst read calculation step 16, the storage level SL of the catalyst is read. At fill catalyst step 18, the storage level SL is used to calculate the amount of $NH_3$ to fill the catalyst. The current storage level (SL) is compared to the actual storage level of the catalyst to determine how much $NH_3$ is to be injected to maintain a selected storage level, which is typically less than the true physical capacity of the catalyst. Other factors may also determine how much $NH_3$ is injected, such as the temperature of the exhaust gas, the flow rate of the exhaust gas, and the area of the engine map that the engine is currently operating in, which will dictate, temperature, flow rate, soot accumulation rate, and the regeneration state, among other factors.

A replaceable cartridge is used as a source of $NH_3$. The cartridge stores a quantity of $NH_3$ that should be sufficient to last the service life of the vehicle, while at the same time, the quantity of $NH_3$ should be nearly depleted at the end of the service life of the vehicle. At cartridge usage calculation step 20, the amount of $NH_3$ usage to empty the cartridge by the service time is calculated. The ECU tracks the $NH_3$ that is dosed from the cartridge, for example with an accumulator.

The catalyst will store the dosed $NH_3$ during certain conditions of low temperature and low flow rate of exhaust gas. As the exhaust gas temperature increases, the $NH_3$ storage capacity of the catalyst decreases. At parameter adjustment step 22, the quantity of $NH_3$ injected is adjusted when dosing parameters are met. The dosing parameters may be a low temperature of exhaust gas, for example less than about 250-degrees C. Alternatively, the dosing parameters for increasing the amount of $NH_3$ dosed may be a low temperature and a low flow rate of exhaust gas, for example when the engine is idling at about 700 rpm. It is possible that the dosing parameters are other temperatures and flow rates, or may include other parameters. When the dosing parameters are met, the quantity of $NH_3$ dosed is adjusted to fill the catalyst with $NH_3$.

Using the method 10, if the ECU determines that regeneration is going to occur within the predetermined parameters, for example in less than about 20 miles of vehicle usage, and if the ECU determines that the dosing parameters are met, for example the exhaust gas temperature is below 250-degrees C., then the quantity of $NH_3$ dosed is increased to rapidly fill the catalyst with $NH_3$ before regeneration occurs.

Subsequently, when the regeneration event occurs, as indicated by an increase of temperature or some other factor, the dosing of $NH_3$ will either be decreased or stopped. The $NH_3$ dosing will be either decreased or completely eliminated during the regeneration event because there is typically a high exhaust gas temperature, high exhaust gas flow rates, and a high likelihood of $NH_3$ slippage during the regeneration event. The catalyst will use the stored $NH_3$ on the catalyst for reducing NOx until the $NH_3$ is depleted.

At tailpipe NOx calculation step 24, the quantity of NOx to be reduced to meet tailpipe emission regulations is calculated. The dosing parameters 22 may be adjusted based on the NOx levels at the tailpipe 24. If insufficient $NH_3$ is being injected to reduce the NOx to meet the emission regulation, the quantity of $NH_3$ injected can be increased.

What is claimed is:

1. A method for injecting ammonia ($NH_3$) into exhaust gas upstream of a catalyst of an aftertreatment system, the method comprising:
monitoring whether a regeneration event will occur in less than a predetermined distance to be driven;
determining that the regeneration event will occur in less than the predetermined distance to be driven;
wherein if the regeneration event is determined to occur in less than the predetermined distance to be driven, the method further comprising:
determining whether the exhaust gas temperature is below a predetermined temperature;
calculating an amount of $NH_3$ to fill the catalyst to a selected storage level;
increasing the quantity of $NH_3$ dosed to fill the catalyst to the selected storage level before the regeneration event occurs under the condition that both the regeneration event will occur in less than the predetermined distance and the exhaust gas temperature is below the predetermined temperature, wherein increasing the quantity of $NH_3$ is determined by at least one of the exhaust gas temperature and an NOx level at a tailpipe;
injecting the adjusted quantity of $NH_3$ into the exhaust gas; and
subsequently decreasing or eliminating the quantity of $NH_3$ injected before the regeneration event occurs under the condition that the exhaust gas temperature exceeds the predetermined temperature.

2. The method of claim 1 further comprising the step of reading an actual storage level of $NH_3$ of the catalyst.

3. The method of claim 1 further comprising calculating a quantity of $NH_3$ usage to empty a cartridge by a service time.

4. The method of claim 1 wherein the predetermined exhaust gas temperature is 250-degrees C.

5. The method of claim 1 wherein the predetermined distance is 20-miles.

6. A method for injecting ammonia ($NH_3$) into exhaust gas upstream of a catalyst of an aftertreatment system, the method comprising:
monitoring whether a regeneration event is imminent on the basis of predetermined parameters;
determining that the regeneration event is imminent on the basis of predetermined parameters;
wherein if the regeneration event is determined to be imminent, the method further comprising:
determining whether the exhaust gas temperature is below a predetermined temperature;
calculating an amount of $NH_3$ to fill the catalyst to a selected storage level;
increasing the quantity of $NH_3$ dosed to fill the catalyst to the selected storage level before the regeneration event occurs under the condition that both the regeneration event will occur in less than the predetermined distance and the exhaust gas temperature is below the predetermined temperature, wherein increasing the quantity of $NH_3$ is determined by at least one of the exhaust gas temperature and an NOx level at a tailpipe;
injecting the adjusted quantity of $NH_3$ into the exhaust gas; and
subsequently decreasing or eliminating the quantity of $NH_3$ injected before the regeneration event occurs under the condition that the exhaust gas temperature exceeds the predetermined temperature.

7. The method of claim 6 further comprising the step of reading an actual storage level of $NH_3$ of the catalyst.

8. The method of claim 6 further comprising calculating a quantity of $NH_3$ usage to empty a cartridge by a service time.

9. The method of claim 6 wherein the predetermined exhaust gas temperature is 250-degrees C.

10. The method of claim 6 wherein the predetermined distance is 20-miles.

* * * * *